June 12, 1962  J. G. LINDER  3,038,616
COMBINATION BENCH AND CONVEYER
Filed Sept. 19, 1958
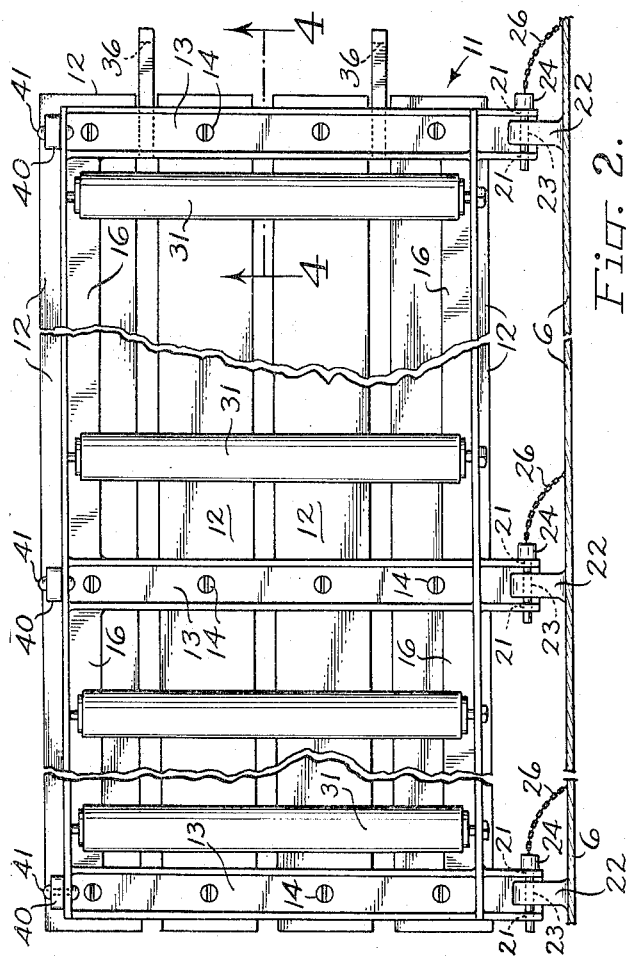
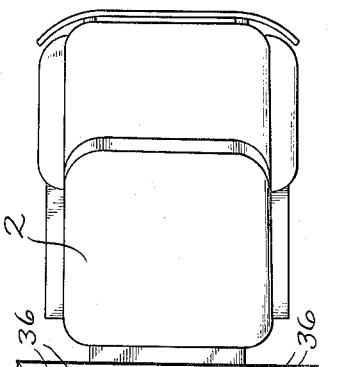
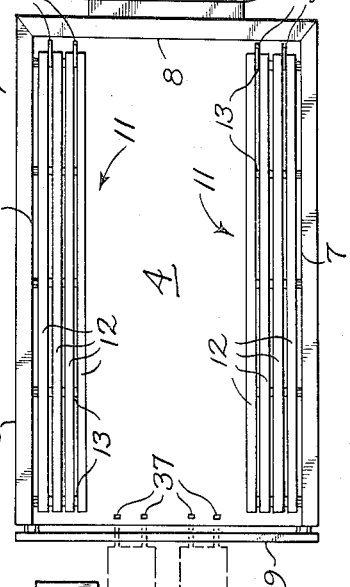
John G. Linder
INVENTOR.
BY Ramsey and Kolisch
Attys.

United States Patent Office 3,038,616
Patented June 12, 1962

3,038,616
COMBINATION BENCH AND CONVEYER
John G. Linder, 8025 NE. Going St., Portland, Oreg.
Filed Sept. 19, 1958, Ser. No. 762,105
5 Claims. (Cl. 214—84)

This invention relates to a device which is a combination bench and conveyer mechanism, and more particularly to a device which is useful, in combination with a vehicle, either for carrying personnel or for loading and unloading materiel into and out of the vehicle.

The invention has particular utility in connection with certain types of military trucks having cargo-carrying hollow bodies, which are employed for transporting personnel and combat material. The invention is described with reference to such a truck, but it should be understood that the invention is also applicable to other types of vehicles.

Under many circumstances, particularly in connection with military movements, it is necessary to transport personnel and/or materiel by means of trucks. It is customary to seat personnel on benches, and to carry equipment on the floor of the vehicle body in space located between the benches.

Loading and unloading of material from a vehicle usually is done by hand, and is usually a relatively slow and laborious task. This is particularly the case where material such as heavy case goods or ammunition are involved. Military line units, for instance, should be prepared to handle pieces ranging in weight to four hundred pounds, whereas other types of units frequently handle heavier loads.

While it may be convenient to provide loading mechanisms at large supply areas or depots to expedite materiel handling, this is not always the case, particularly under combat conditions. Further, if loading mechanisms are provided, they may be lost or otherwise not available for the loading or unloading of a particular vehicle. As an alternative, each vehicle might be provided with its own loading mechanism, intended only for use with the vehicle and designed for transport with the vehicle. This procedure has not been practical, as it has been the general rule to eliminate bulky extra equipment and equipment that might be easily damaged or lost.

According to an embodiment of this invention, a military truck is provided with a pair of elongated benches, and these benches are constructed to perform the dual roll of functioning as gravity-type conveyers for conveying materiel into or out of a truck, as well as providing support for seating personnel.

Thus it is a principal object of the invention to provide, in combination with a vehicle, a device which may be used either as a seat or as a low-friction conveyer.

A more specific object of the invention is to provide, for a vehicle having a cargo-carrying body, a pair of detachable benches mounted along the side walls of the vehicle body, which have mounted along their undersides conveyer means for rolling heavy articles in a path disposed along the length of the benches when the benches are inverted. A vehicle provided with a pair of such benches can easily be loaded with articles of considerable size and bulk, if the benches are inverted and laid side by side to extend from a loading area to the vehicle body floor. By using benches running the length of the vehicle body, relatively long conveyers are possible.

Another object is to provide, in combination with a vehicle, benches which may be used both for supporting people and for unloading and loading materiel, the benches being characterized by a unitary, self-contained construction which promotes use of the benches in either of their capacities without the possibility of accidental loss of separate pieces which would impair use of the benches.

Still another object of the invention is to provide removable benches for a vehicle which may be detached and inverted and then be used as conveyers in loading the vehicle, and which may be incorporated with vehicles of conventional existing design without extensive modification of the vehicle.

These and other objects, features, and advantages are attained by the invention, which is described hereinbelow in conjunction with the accompanying drawings, wherein:

FIG. 1 is a top plan view of an embodiment of the invention, showing a military-type, cargo-carrying truck equipped with bench devices constructed according to this invention, and showing in dotted outline how the bench devices may be inverted and used as conveyers for loading;

FIG. 2 is a view looking upwardly at the underside of one of the bench devices;

FIG. 3 is an end elevation showing a bench device mounted in a vehicle so as to seat passengers; and FIG. 4 is a section view along the line 4—4 in FIG. 2.

With reference now to the drawings, which illustrate the invention in a combat vehicle organization, 1 indicates generally a truck of a conventional type used by the military for transporting personnel and materiel. The truck comprises a cab section 2 for the driver, and at the rear end thereof a hollow, cargo-carrying vehicle body 3. The confines of body 3 are defined by a floor 4, side walls 6 and 7, a front wall 8, and a tail gate 9. Longitudinally arranged within the vehicle body and running along opposite side walls 6, 7 are a pair of bench devices designated generally at 11. The bench devices are shown in FIG. 1 mounted for the support of personnel in a sitting position. Materiel may be loaded on floor 4 of the body in the space located between the bench devices.

The two bench devices 11 are similar in construction. Each comprises a horizontal top or seating surface, which, in the form of the invention shown, is made up of a plurality of elongated slats 12 mounted side by side and held together by transverse brace bars 13. Slats 12 may be secured to bars 13 as by screws 14. Interconnecting the ends of brace bars 13 for each bench device are a pair of elongated side frame members 16. Slats 12, bars 13, and members 16 make up the body of each bench device.

Generally slats 12 will be formed from wood, and bars 13 and members 16 will be formed from metal, in order that the devices have suitable rigidity and strength. Aluminum or other similar materiel may be used advantageously in the manufacture of bars 13 and members 16, as the metal is light, and non-sparking (an important consideration in military vehicles).

Each of the bench devices is secured to one of the side walls of body 3 by pin and hole connections. Specifically, bars 13 protrude outwardly slightly to one side of the main body portion of each bench device, and these protruding end portions have holes or pin-receiving apertures 21 extending therethrough, which lie in a common plane extending along one side of a bench device. Secured in a suitable manner to the side walls of body 3 are a series of ear portions 22, which are spaced from each other a distance equal to the spacing between successive bars 13. Ears 22 are provided with holes or pin-receiving apertures 23. When a bench device is to be mounted for seating passengers, holes 21 are moved into registry with holes 23, and a series of pins 24 inserted through complementing hole sets. This secures one side of the bench device in position on a side wall of the vehicle body. The bench device is pivotable about the pin connections between horizontal and raised positions, in addition to being detachable from the vehicle.

Pins 24, which constitute a detachable locking means, are connected to vehicle body 3 by flexible chain segments 26. Thus there are no loose parts which might be lost inadvertently during use. Alternatively the pins could be attached to a bench device, but this tends to be disadvantageous, as the pins might encumber use of the device as a conveyer.

Mounted on the underside of each bench device is a rotatable conveyer mechanism, comprising a series of rotatable, elongated rollers 31 rotatably supported at their ends in side frame members 16. The rollers are rotatable about axes extending transversely of the bench device, and thus accommodate the low-friction transport of articles supported on the rollers in a path extending the length of the bench device. Skate wheels, belt devices, or other friction-reducing means may be used, but rollers have the advantage of being sturdy and able to withstand exposure over long periods of time without impairment of their operation. Rollers also occupy relatively little room, and the use of rollers permits a relatively compact design.

Referring to FIG. 4, at one end of each bench device there are provided a pair of hooks, or catch means 36. Hooks 36 are integral with the transverse brace bar 13 extending across the right end of each bench device in FIGS. 1 and 2. The hooks project outwardly from a bench device in a direction extending away from the side of the device mounting rollers 31. The hooks fit into cutouts 37 provided in floor 4 of the vehicle body, and provide a means for securing one end of the device to floor 4 when the device is to be used as a conveyer.

A series of legs 40 are connected to each bench device along the side of the device opposite the projecting ends of bars 13. These are connected by pivot connections 41 to the bench device. The legs pivot about axes extending transversely of the bench device, between a raised position wherein the legs are substantially flush with the body of the bench device, and a lowered position (shown in FIG. 3) wherein they provide support. The legs are not separable, which prevents accidental loss of the legs. Other means of support may be used, but it is desirable to have the support means joined either to the vehicle or to a bench device.

When it is desired to use a bench device as a conveyer, it is detached from the body of the truck by pulling out pins 24. The device is then turned over, so as to turn up the conveyer mounted on the underside of the device. One end of the device may then be fastened to the rear end of floor 4, after dropping tail gate 9, by inserting hooks 36 through a pair of cutouts 37. The other end of the device is supported by resting it on the loading area.

The dotted lines in FIG. 1 show a pair of the devices which are the subject of this invention mounted in a conveying position. If both benches are utilized at once, heavy, bulky loads are easily handled. With smaller and lighter articles only one device need be used. Thus by providing a pair of devices with each vehicle, a considerable degree of flexibility is possible.

If it is desired to leave the devices secured to the side walls of body 3 and make more room in the body of the truck for carrying materiel, the bench devices may be swung up to a substantially vertical position against walls 6 and 7 by pivoting the bench devices about the pivot connections provided by pins 24.

It will be appreciated by those familiar with the transportation of personnel and materiel that the invention affords a simple, inexpensive solution to a variety of problems. The bench devices provide comfortable, sturdy seating for personnel, and make possible greater travel use of a vehicle by speeding up loading and unloading time. The devices are particularly constructed with a view toward eliminating loose parts which could be lost.

It is claimed and desired to secure by Letters Patent:

1. In combination with a passenger and load-carrying vehicle having a pair of side walls and a floor defining an elongated cargo-carrying space; a pair of elongated, combined bench and conveyer mechanisms disposed in said cargo-carrying space and extending at raised elevation substantially the length of said space; one of said mechanisms being adjacent one of said side walls and the other of said mechanisms being adjacent the other of said side walls; means detachably mounting each of the bench and conveyer mechanisms in place constructed to enable each substantially completely to be removed as a unit from said space whereby the space may be made substantially completely open; each of said mechanisms comprising an elongated body having an elongated, substantially horizontal upper surface expanse for support of vehicle passengers in seated position, and rotatable conveyer means mounted on the underside of said body and shielded by said upper surface expanse, for the low-friction transport of articles in a path extending the length of said body when said body is detached from said vehicle and inverted.

2. In combination with a passenger and load-carrying vehicle having a pair of side walls and a floor defining an elongated, hollow, vehicle body portion, a pair of elongated bench portions disposed at raised elevation and within and along the length of the vehicle body portion, one along one side and one along the other side of the vehicle body portion, each of the bench portions having an upper passenger-supporting surface and a conveyer mechanism carried along the underside thereof and shielded by its upper passenger-supporting surface, each conveyer mechanism accommodating low-friction transport of articles in a path along the length of the bench portion when the bench portion is inverted, and means detachably connecting each bench portion to the vehicle body portion and constructed to enable each to be substantially completely removed as a unit from within the vehicle body portion, the latter means comprising detachable lock means mounted on one of the portions and detachable from the other of the portions, said lock means supporting the bench portion in spaced relation over said floor of the vehicle body portion.

3. In combination with a passenger and load-carrying vehicle having a pair of side walls and a floor defining an elongated, hollow, vehicle body part; a pair of elongated bench parts disposed at raised elevation and within and along the length of said vehicle body part for seating passengers; one along one side and one along the other side of vehicle body part; each of the bench parts having an upper substantially horizontal passenger-supporting surface, a set of elongated rolls mounted beneath said passenger-supporting surface and shielded thereby, the rolls of each bench part being spaced along the length of the bench part at regular intervals and being rotatable about axes extending transversely of the bench part, leg supports carried by the bench part along one side thereof and supporting the bench part above the floor of the vehicle body part, means along the other side of the bench part detachably securing the bench part to a side wall of the vehicle and constructed to enable the bench part substantially completely to be removed as a unit from the vehicle body part, and catch means at one end for securing the bench part in fixed inverted position to the rear of the vehicle body part after detachment of the bench part from a side wall of the vehicle body part.

4. The combination of claim 3 wherein the means along said other side of each bench part comprises plural pin-receiving apertures, said pin-receiving apertures registering with complementary pin-receiving apertures carried by a side wall of the vehicle body part, and plural attachment pins, each inserted through complementing sets of pin-receiving apertures, said pins being connected by a flexible connection to one of said parts.

5. In a passenger and load-carrying vehicle having side walls and a floor defining an elongated hollow vehicle body, an elongated bench disposed at passenger-supporting level along one side of said body and extending substantially the length thereof, and means detachably mounting the bench constructed to enable it completely to be removed as a unit from the hollow body, said bench having an elongated substantially rectangular and horizontally disposed frame, elongated slat members secured to the upper side of said frame extending longitudinally of the frame and disposed side by side across its width, plural roller mechanisms extending transversely of the frame and slat members rotatably mounted on the frame beneath said slat members and covered thereby, and means detachably for mounting one end of the bench in an inverted position to the rear end of the vehicle body.

References Cited in the file of this patent

UNITED STATES PATENTS

| | | |
|---|---|---|
| 189,706 | Day | Apr. 17, 1877 |
| 418,023 | Head | Dec. 24, 1890 |
| 711,677 | Richardson | Oct. 21, 1902 |
| 2,324,508 | Johnson | July 20, 1943 |
| 2,347,002 | Schofield | Apr. 18, 1944 |
| 2,729,501 | Van Doorne et al. | Jan. 3, 1956 |